US008192917B2

(12) United States Patent
Tomura et al.

(10) Patent No.: US 8,192,917 B2
(45) Date of Patent: Jun. 5, 2012

(54) MATERIAL FOR MULTIPHOTON FLUORESCENCE MICROSCOPE AND MULTIPHOTON FLUORESCENCE MICROSCOPE

(75) Inventors: Tatsuya Tomura, Tokyo (JP); Tsutomu Sato, Yokohama (JP); Takeshi Miki, Tokyo (JP); Mikiko Takada, Kawasaki (JP); Masaomi Sasaki, Susono (JP)

(73) Assignee: Ricoh Company, Ltd., Tokyo (JP)

( * ) Notice: Subject to any disclaimer, the term of this patent is extended or adjusted under 35 U.S.C. 154(b) by 461 days.

(21) Appl. No.: 12/441,490

(22) PCT Filed: Jun. 12, 2008

(86) PCT No.: PCT/JP2008/061177
§ 371 (c)(1),
(2), (4) Date: Mar. 16, 2009

(87) PCT Pub. No.: WO2009/001736
PCT Pub. Date: Dec. 31, 2008

(65) Prior Publication Data
US 2009/0323508 A1 Dec. 31, 2009

(30) Foreign Application Priority Data

Jun. 28, 2007 (JP) .................................. 2007-170598

(51) Int. Cl.
| *G11B 7/24* | (2006.01) |
| *G09B 67/44* | (2006.01) |
| *B22F 9/24* | (2006.01) |
| *C09B 23/00* | (2006.01) |

(52) U.S. Cl. ................... 430/270.11; 369/284; 556/113; 548/403; 546/6

(58) Field of Classification Search ........................ None
See application file for complete search history.

(56) References Cited

U.S. PATENT DOCUMENTS 5,854,868 A 12/1998 Yoshimura et al.
(Continued)

FOREIGN PATENT DOCUMENTS

JP 6 28672 2/1994
(Continued)

OTHER PUBLICATIONS

Imahori et al., "Photoactive three dimensional monolayers Porphyrin-alkane stabilized gold clusters", J. Am. Chem. Soc., vol. 123(2) pp. 335-336 (2001).*

(Continued)

*Primary Examiner* — Martin Angebranndt
(74) *Attorney, Agent, or Firm* — Oblon, Spivak, McClelland, Maier & Neustadt, L.L.P.

(57) ABSTRACT

A photosensitized composite material and a material, an element, a device, and the like, which employ the photosensitized composite material, are provided. In the photosensitized composite material, multiphoton absorption compounds are highly sensitized for practical use by utilizing an enhanced plasmon field. The photosensitized composite material has a structure where the multiphoton absorption compounds are linked to the surface of a fine metal particle through linking groups. The fine metal particle generates an enhanced surface plasmon field in resonance with a multiphoton excitation wavelength. The multiphoton absorption compounds have a molecular structure enabling multiphoton absorption. The photosensitized composite material is contained in or used for, for example, a three-dimensional memory material and a three-dimensional recording medium, an optical power limiting material and an optical power limiting element, a photocuring material and a stereolithography system, and a fluorescent material for a multiphoton fluorescence microscope and a multiphoton fluorescence microscope.

5 Claims, 5 Drawing Sheets

U.S. PATENT DOCUMENTS

| | | | |
|---|---|---|---|
| 2004/0079195 | A1 | 4/2004 | Perry et al. |
| 2008/0092310 | A1 | 4/2008 | Miki et al. |
| 2009/0075014 | A1* | 3/2009 | Miki et al. ............... 428/64.4 |
| 2010/0055448 | A1* | 3/2010 | Tomura et al. ............ 428/328 |

FOREIGN PATENT DOCUMENTS

| | | |
|---|---|---|
| JP | 6 118306 | 4/1994 |
| JP | 8 320422 | 12/1996 |
| JP | 2000 512061 | 9/2000 |
| JP | 2001 508221 | 6/2001 |
| JP | 2001 513198 | 8/2001 |
| JP | 2001 522119 | 11/2001 |
| JP | 2001 524245 | 11/2001 |
| JP | 2004 156911 | 6/2004 |
| JP | 2004 530867 | 10/2004 |
| JP | 2004 531875 | 10/2004 |
| JP | 2005 68447 | 3/2005 |
| JP | 2006 330683 | 12/2006 |
| WO | 2006/118311 | * 11/2006 |

OTHER PUBLICATIONS

Makarov et al., "Two photon absorption standards in the 550-1600 nm excitation wavelength range", Opt. Exp., vol. 16(6) pp. 4029-4047 (Mar. 2008).*

Fu et al., "biomedical applications of gold nanoparticles functionalized using hetero-bifunctional poly(ethylene glycol) spacer", Mater., Res. Soc. Symp. Proc., vol. 845 pp. 223-228 (2005).*

Thomas et al., "chromophore-functrionalized gold nanoparticles", Acc. Chem. Res., vol. 36(12) pp. 888-898 (Sep. 2003).*

Cannone et al., "Two photon interactions at single fluorescent molecule level", J. Biomed. Opt., vol. 8(3) pp. 391-395 (Jul. 2003).*

Mandzhikov et al., "nonlinear coloration of photochromicspiropyran solutions"., Sov. J. Quant. Opt., vol. 3(2) pp. 128129 (Sep. 10, 1973).*

Zijlstra et al., "functionalisation of gold nanorods and it's application to optical data storage" IEEE, ICONN 2006 pp. 12-14 (2006).*

Stranik et al., "Optimization of nanoparticle size for plasmonic enhancement of fluoescence" Plasmonics vol. 2, pp. 15-22 (Dec. 2006).*

Varnavski et al. "Ultrafast energy migration in chromophore shell-metal nanoparticle assemblies" JACS 128(34) pp. 10988-10989 (2006).*

Kuwahara et al. "Facile fabrication of photoelectrochemical assemblies consisting of gold nanoparticles and a tris(2,2'-bipyridine)ruthenium(II)-viologen linked thiol", Langmuir, vol. 17(19) pp. 5714-5716 (2001).*

Ishida et al. "Surface plasmon excitation of porphyrin self-assembly monolayers on an Au surface" Nanotechnol. vol. 10 pp. 308-314 (1999).*

Imahori "Structure and photophysical properties of porphyrin-modified metal nanoclusters with different chain lengths" Langmuir vol. 20(1) pp. 73-81 (2004).*

Wenseleers, W. et al., "Five Orders-of-Magnitude Enhancement of Two-Photon Absorption for Dyes on Silver Nanoparticle Fractal Clusters", J. Phys. Chem. B, vol. 106, No. 27, pp. 6853-6863, (2002).

Link, S. et al., "Simulation of the Optical Absorption Spectra of Gold Nanorods as a Function of Their Aspect Ratio and the Effect of the Medium Dielectric Constant", J. Phys. Chem. B, vol. 103, No. 16, pp. 3073-3077, (1999).

Albota, M. et al., "Design of Organic Molecules with Large Two-Photon Absorption Cross Sections", Science, vol. 281, pp. 1653-1656, (1998).

Office Action issued Dec. 22, 2011 in Taiwan Patent Application No. 097123175 w/English translation.

* cited by examiner

MATERIAL FOR MULTIPHOTON FLUORESCENCE MICROSCOPE AND MULTIPHOTON FLUORESCENCE MICROSCOPE

TECHNICAL FIELD

The present invention relates to a multiphoton absorption material and, more particularly, to a photosensitized composite material, which exerts high sensitization effects, and applications thereof to materials, device electronics elements, and the like (a three-dimensional memory material and a three-dimensional recording medium, an optical power limiting material and an optical power limiting element, a photocuring material and a stereolithography system, and a fluorescent material for a multiphoton fluorescence microscope and a multiphoton fluorescence microscope).

BACKGROUND ART

Two-photon absorption, a type of multiphoton absorption, can be utilized for various applications featuring extremely high spatial resolution. As of now, available two-photon absorption compounds have low two-photon absorptivity. Thus, it is necessary to use an expensive, very high-power laser as a pumping source for inducing two-photon absorption.

Accordingly, to practically use a small, inexpensive laser for a technology utilizing two-photon absorption, it is necessary to develop highly efficient two-photon absorption compounds, and the sensitization technology thereof plays an important role.

Meanwhile, to sensitize one-photon absorption process based on optical principles, an enhanced surface plasmon field, which is excited on the surface of a metal, is used to optically measure a small amount of substance.

For example, a technology has been proposed in which an ultrathin film (an enhanced surface plasmon field is generated only at a region approximately 100 nm or less apart from the surface) is disposed on a thin metal film formed on a medium having a high index of refraction and is used as a sample for a surface plasmon microscope (e.g., refer to Patent Document 1).

Alternatively, a measurement technology has been known in which an enhanced surface plasmon field excited by fine metal particles is employed. Similar to the technology disclosed in Patent Document 1, an observation measurement region in this technology is limited to a region 100 nm or less apart from the periphery of the fine metal particle. Thus, highly sensitive observation can be performed by observing a sample adsorbed to the surface of the particle.

However, the technology disclosed in Patent Document 1 utilizes enhancement effects on the thin film, and a sample is limited (ultrathin film on the thin metal film).

Specifically, the region which can utilize enhancement effects of the surface plasmon depends on a shape of the thin metal film and an arrangement of an optical system. Therefore, it is difficult to apply the technology to applications such as three-dimensional process.

Moreover, to select a wavelength used for the observation, a technology has been known in which a resonant wavelength is tuned by a spherical core cell structure (e.g., refer to Patent Document 2).

The technology disclosed in Patent Document 2 utilizes an enhanced surface plasmon field generated around particles such as fine metal particles. Compared with the technology disclosed in Patent Document 1, the shape of a substance generating an enhanced field is less limited. However, the particle generating the enhanced surface plasmon field sensitizes one-photon absorption, and the application area is limited only to fine particles. Thus, the technology has disadvantages that a limited wavelength can be used and the application area is limited for practical use.

Furthermore, a highly sensitive observation method using aggregate nanoparticles disposed in microcavities has been proposed, including a multiphoton process (e.g., refer to Patent Document 3).

A technology disclosed in Patent Document 3 has a disadvantage that applications of the enhanced field are limited since the aggregate nanoparticle generating the enhanced surface plasmon field is disposed in a microcavity.

Meanwhile, instead of the above fine metal particle, a technology utilizing a gold nanorod has been studied to generate an enhanced surface plasmon field. Gold nanorods can change a resonant wavelength by changing its aspect ratio. The gold nanorod is a material compatible with light having a wavelength from approximately 530 nm to the near infrared region (approximately 1100 nm).

A method has been proposed in which the gold nanorod is prepared by electrochemical reaction in a solution containing a surfactant (e.g., refer to Patent Document 4).

In the technology disclosed in Patent Document 4, a range of an excitation wavelength is wider for an enhanced surface plasmon field generator capable of tuning a wavelength. However, an arrangement of a pumping source and a reactive substance are problematic.

The inventors of the present invention have proposed in advance that a multiphoton absorption material (e.g., a two-photon absorption material) is mixed with a fine metal particle or a gold nanorod to achieve two-photon sensitization, and the mixture is applied to a device (e.g., refer to Patent Document 5).

The technology disclosed in Patent Document 5 is excellent for sensitizing multiphoton absorption reaction. However, the technology has a disadvantage.

Specifically, fine metal particles and metal nanorods are dispersed in an aqueous solvent to be used. By contrast, most of the multiphoton absorption materials are difficult to be dissolved in water. Thus, to obtain a thin film or a bulk from the mixture of the multiphoton absorption material and the fine metal particle or the metal nanorod, it is necessary to uniformly disperse the fine particles or the rods in an organic solvent.

A two-photon absorption material, one of the multiphoton absorption materials, can excite molecules in a wavelength of non-resonant region. An actual excited state of the material is at an energy level approximately twice as much as that of photons used for the excitation.

Two-photon absorption, a type of multiphoton absorption, is a type of three-dimensional nonlinear optical effects. A molecule absorbs two photons simultaneously to transit from the ground state to the excited state. The two-photon absorption has been known for a long period of time. Study on a material having two-photon absorptivity has been recently advanced since Jean-LucBredas et al. unraveled the relationship between the molecular structure and mechanism in 1998 (Science, 281, 1653 (1998)).

However, the transition efficiency of this simultaneous two-photon absorption is much less than that of one-photon absorption, and the two-photon absorption requires photons having an extremely large power density. Accordingly, two-photon absorption is hardly observed with a normally used laser light intensity. When an ultrashort (femtosecond) pulse laser is used (e.g., a mode locking laser having a high peak light intensity (light intensity at the maximum luminous wavelength)), it is confirmed that two-photon absorption is observed.

The transition efficiency of the two-photon absorption is proportional to the square of the intensity of an applied optical field (square-law characteristics of two-photon absorption). Accordingly, when a laser beam is applied, two-photon absorption occurs only at a position where field intensity is high in the center of a laser spot, and two-photon absorption does not occur at a position where field intensity is low in the peripheral portion. In a three-dimensional space, two-photon absorption occurs only at an area where field intensity is high at a focal point of the laser beam condensed by a lens. Two-photon absorption does not occur at all an area outside the focal point where field intensity is low. Compared with one-photon linear absorption in which excitation occurs at all the positions proportionally to the intensity of the applied optical field, excitation occurs only at a pinpoint region in a space due to the square-law characteristics. Thus, spatial resolution is significantly improved.

A three-dimensional memory, which records bit data by utilizing the above characteristics to change spectrum, index of refraction, or polarized light due to two-photon absorption at a predetermined position of a recording medium, has been studied. As described above, two-photon absorption occurs proportionally to the square of the light intensity. Thus, the memory utilizing the two-photon absorption is enabled to perform ultra resolution recording since its spot size is smaller than that of the memory utilizing the one-photon absorption. In addition, the two-photon absorption has high spatial resolution due to the square-law characteristics. Therefore, applications of the two-photon absorption to optical power limiting materials, photocuring resins (a photocuring material) for stereolithography, fluorescent dye materials for a two-photon fluorescence microscope, and the like have been developed.

To induce two-photon absorption, it is possible to employ a short pulse laser of the near infrared region which has a longer wavelength than a wavelength region having a linear absorption band of the compound and in which no absorption occurs.

Since near infrared light of a transparent region, which does not have a linear absorption band of the compound, is employed, excitation light can reach, for example, the inside of a sample, without being absorbed or scattered. Besides, a pinpoint region in the sample can be excited with high spatial resolution due to the square characteristics of the two-photon absorption. Thus, two-photon absorption and two-photon luminescence are expected to be applied to two-photon contrast imaging of a biological tissue and photo-chemotherapy such as two-photon photodynamic therapy (PDT).

Moreover, when the two-photon absorption or two-photon luminescence is employed, photons having energy higher than that of incident photons can be taken out. Thus, study on up-conversion lasing has been reported in terms of a wavelength conversion device.

Various inorganic materials have been discovered as the two-photon absorption materials. However, it is difficult to design molecules in the inorganic material to obtain desired two-photon absorption characteristics and other necessary characteristics for element manufacturing.

By contrast, desired two-photon absorption can be obtained by designing molecules in an organic compound. Moreover, other characteristics can be controlled in the organic compound. The organic compound has a potential for practical use and is considered as a prospect two-photon absorption material.

Dye compounds such as rhodamine and coumalin, dithienothiophene derivatives, and oligophenylenevinylene derivatives are known as conventional organic two-photon absorption materials. However, these compounds have small two-photon absorption sectional areas per molecule, which indicate two-photon absorptivity. When a femtosecond pulse laser is used, most of the two-photon absorption sectional areas are less than 200 (GM: $\times 10^{-50}$ $cm^4 \cdot s \cdot molecule^{-1} \cdot photon^{-1}$). Thus, industrial applications of these compounds have not been made yet.

For example, regarding a field to which a three-dimensional multilayered optical memory using a two-photon absorption material is expected to be applied, network such as the Internet and a high vision television are recently and rapidly spread. Moreover, high definition television (HDTV) broadcast is starting soon, and the demand for mass storage recording media has been increasing to record image information of 50 GB or more and preferably 100 GB or more inexpensively and simply for consumer use. Furthermore, optical recording media have been demanded for business applications such as computer and broadcast backups to record mass information of approximately 1 TB or more inexpensively at high speed.

Meanwhile, the capacity of a conventional two-dimensional optical recording medium such as DVD±R is about 25 GB although a recording/reproducing wavelength is shortened based on physical principles. This capacity is not enough for the future use.

In this present situation, a three-dimensional optical recording medium has been prominently expected as an ultimate high density, high capacity recording medium. In the three-dimensional optical recording medium, recordings can be superposed on several tens or several hundreds of layers in a three-dimensional (thickness) direction. Alternatively, it is possible to perform recording/reproducing repeatedly in a light incident direction when the recording layer is considered as a thick film. By using the three-dimensional recording medium, ultra high density, ultra high capacity recording can be achieved, which is several tens or several hundreds higher than the conventional two-dimensional recording medium.

To provide a three-dimensional optical recording medium, information needs to be written with access to a predetermined area in a three-dimensional (thickness) direction. To achieve this, a two-photon absorption material or holography (interference) may be used.

In the three-dimensional optical recording medium using a two-photon absorption material, bit recording which can record information several ten or several hundred times as much as the conventional recording, is enabled based on the aforementioned physical principles, thereby enabling higher density recording. Therefore, the three-dimensional optical recording medium is an ultimate high density, high capacity optical recording medium.

For example, for the three-dimensional optical recording medium using the two-photon absorption material, a method for reading with fluorescence by using a fluorescent substance for recording/reproducing (e.g., refer to Patent Documents 6 and 7), a method for reading with absorption or fluorescence by using a photochromic compound (e.g., refer to Patent Documents 8 and 9), and the like have been proposed.

However, Patent Documents 6 and 7 do not describe a specific two-photon absorption material, but abstractly describes a two-photon absorption compound such as a two-photon absorption compound with extremely small two-photon absorption efficiency, for example.

Moreover, the photochromic compounds used in Patent Documents 8 and 9 are reversible materials, there are problems of nondestructive readout, long-term archivability of recording, an S/N ratio of reproducing, and the like. Thus, the photochromic compounds are not suitable for an optical recording medium in practical use. In terms of nondestructive readout, long-term archivability of recording and the like, an irreversible material is preferably used to change reflectivity (index of refraction and absorptivity) or luminescence intensity to reproduce. However, there is no specific description on the two-photon absorption material having these properties.

A recording apparatus, a reproducing apparatus, readout, and the like have been proposed for three-dimensional recording by changing the index of refraction (e.g., refer to Patent Documents 10 and 11). However, there is no description on a method for using two-photon absorption three-dimensional optical recording medium.

It is known that fine (spherical) silver particles and a styrylbenzene two-photon material are linked by an alkyl chain to exert enhancement effects by two-photon characteristics (e.g., refer to Non-Patent Document 1). In this case, light having a wavelength which can efficiently exert two-photon absorption characteristics the most (i.e., 740 nm to 900 nm) does not resonate with (is not absorbed to) fine (spherical) silver particles. Thus, it is impossible to enhance the effects of the enhanced surface plasmon field.

[Patent Document 1] Japanese Patent Application Laid-Open (JP-A) No. 2004-156911
[Patent Document 2] JP-A (Translation of PCT Application) No. 2001-513198
[Patent Document 3] JP-A (Translation of PCT Application) No. 2004-530867
[Patent Document 4] JP-A No. 2005-68447
[Patent Document 5] JP-A No. 2006-330683
[Patent Document 6] JP-A (Translation of PCT Application) No. 2001-524245
[Patent Document 7] JP-A (Translation of PCT Application) No. 2000-512061
[Patent Document 8] JP-A (Translation of PCT Application) No. 2001-522119
[Patent Document 9] JP-A (Translation of PCT Application) No. 2001-508221
[Patent Document 10] JP-A No. 6-28672
[Patent Document 11] JP-A No. 6-118306
[Non-Patent Document 1] Wim Wenseleers et al., J. Phys. Chem. B 2002, 106, 6853-6863

DISCLOSURE OF INVENTION

As previously mentioned, a two-photon absorption compound, one of available multiphoton absorption compounds at the present time, have low two-photon absorptivity. Accordingly, it is necessary to use an extremely high-power laser as a light source, and it takes a long period of time for recording.

For example, to use a recording material for a three-dimensional optical recording medium to achieve a fast transfer rate, it is necessary to design a two-photon absorption three-dimensional optical recording material to record with high sensitivity due to luminescence by two-photon absorption. To achieve this, a material containing a two-photon absorption compound and a recording component is effective. The two-photon absorption compound can generate an excited state by absorbing two photons with high efficiency. The recording component can efficiently form a difference of optical characteristics of the two-photon absorption optical recording material by a predetermined method utilizing the excited state of the two-photon absorption compound. Such a material has been hardly disclosed, and the material and the method for designing the same have been desired.

Specifically, the reaction is performed by using the excitation energy obtained by two-photon absorption, a type of multiphoton absorption. As a result, in a case where luminescence intensity can be modulated in a non-writable mode when a laser focal (recording) portion and a non-focal (non-recording) portion are irradiated with light, it is possible to cause luminescence intensity modulation with extremely high spatial resolution at a predetermined area in the three-dimensional space. This can be applied to the three-dimensional optical recording medium considered as an ultimate high density recording medium. Moreover, nondestructive readout is enabled with the material, and the material is irreversible. Thus, good storage stability is expected, and the material can be practically used.

An object of the present invention is to provide a multiphoton absorption compound utilizing an enhanced plasmon field, particularly a photosensitized composite material in which a two-photon absorption compound is highly sensitized for practical use, as well as a functional material, a highly functionalized element, a device, an observation apparatus, and the like (e.g., a three-dimensional memory material and a three-dimensional recording medium, an optical power limiting material and an optical power limiting element, a photocuring material and a stereolithography system, a fluorescent material for a multiphoton fluorescence microscope and a multiphoton fluorescence microscope), which utilize features such as ultra high density, ultra precision, and high resolution exerted by using the composite material.

Hereinafter, the term "multi (two) photon absorption compound" is sometimes mentioned and means a multiphoton absorption compound, especially a two-photon absorption compound. The definition of the term includes "multiphoton absorption compound and/or two-photon absorption compound." Other similar terms such as "multi (two) photon excitation" have the same meaning.

The inventors of the present invention have thoroughly studied and discovered that the problems are overcome by the invention described in [1] to [14]. The invention is detailed hereinafter.

[1] A photosensitized composite material includes a fine metal particle which generates an enhanced surface plasmon field in resonance with a multiphoton excitation wavelength; and a multiphoton absorption compound which has a molecular structure enabling multiphoton absorption, in which the multiphoton absorption compound is linked to a surface of the fine metal particle.

[2] In the photosensitized composite material according to [1], the multiphoton excitation wavelength is a two-photon excitation wavelength, and the multiphoton absorption compound is a two-photon absorption compound.

The transition efficiency of the two-photon absorption is proportional to the square of an applied optical field. When a laser beam is applied, two-photon absorption occurs only at a position where field intensity is high in the center of a laser spot. Thus, spatial resolution can be significantly improved. By utilizing the two-photon absorption characteristics, applications to, for example, an optical power limiting element, stereolithography, and a multiphoton fluorescence microscope are possible.

[3] In the photosensitized composite material according to any one of [1] and [2], the multiphoton absorption compound is linked to the surface of the fine metal particle through a linking group having a site linking to the surface of the fine metal particle and a site linking to the multiphoton absorption compound.

[4] In the photosensitized composite material according to any one of [1] to [3], the multiphoton absorption compound has a molecular structure preliminarily linked to the site of the linking group, the site linking to the multiphoton absorption compound.

[5] In the photosensitized composite material according to any one of [3] and [4], the linking group is an alkylene group.

According to [3], [4], and [5], a chain length of the linking group is controlled so that a distance between the fine metal particle and the multiphoton absorption compound is maintained to keep the maximum efficiency of the enhanced plasmon field.

[6] In the photosensitized composite material according to any one of [1] to [5], the fine metal particle is a gold nanorod.

By controlling the aspect ratio R (major axis/minor axis) of the gold nanorod, it is possible to absorb light having any wavelength between visible light and near infrared radiation. Thus, the gold nanorod has a wide range of wavelength selection. When the major axis/minor axis of the gold rod is controlled to conform with the wavelength, enhancement efficiency can be further improved.

[7] A three-dimensional memory material includes the photosensitized composite material according to any one of [1] to [6], in which the three-dimensional memory material is enabled to perform recording and reproducing in a depth direction of a layer surface by light incident to the layer surface in a vertical direction.

[8] An optical power limiting material includes the photosensitized composite material according to any one of [1] to [6].

[9] A photocuring material includes the photosensitized composite material according to any one of [1] to [6].

[10] A fluorescent material for a multiphoton fluorescence microscope includes the photosensitized composite material according to any one of [1] to [6].

[11] A three-dimensional recording medium includes a layer surface including the photosensitized composite material according to any one of [1] to [6], in which the three-dimensional recording medium is enabled to perform recording and reproducing in a depth direction of the layer surface by light incident to the layer surface in a vertical direction.

[12] An optical power limiting element includes the photosensitized composite material according to any one of [1] to [6].

[13] A stereolithography system includes the photosensitized composite material according to any one of [1] to [6].

[14] A multiphoton fluorescence microscope apparatus includes the photosensitized composite material according to any one of [1] to [6].

In the photosensitized composite material of the present invention, the linking group suitably maintains a distance between the fine metal particle and the multiphoton absorption compound and links the particle and the compound. Thus, the efficiency of the enhanced plasmon field is maintained at the maximum level, thereby achieving sensitization of the multi (two) photon absorption compound and improving transition efficiency of the photon absorption. By containing or using the photosensitized composite material, the applications to practical use employing a small, inexpensive laser are possible. Specifically, applications are possible making full use of ultra high density, ultra precision, high resolution, and the like exerted by using the photosensitized composite material.

According to the three-dimensional memory material and the three-dimensional recording medium of the present invention, ultra high density and ultra mass storage, which are demanded for a mass storage recording medium (e.g., 50 GB or more, preferably 100 GB or more) for consumer use or a mass storage recording medium (approximately 1 TB or more), can be achieved.

According to the optical power limiting material and the optical power limiting element, it is possible to control an optical signal by an optical signal (optical control such as modulation and switching), thereby making full use of broad bands and high-speed, which are advantages of the light, in optical communication and optical information processing.

According to the photocuring material and the stereolithography system of the present invention, it is possible to make full use of features such as processing resolution, ultra high-speed lithography, three-dimensional processing, and high yield exceeding diffraction limit to freely form a desired three-dimensional processing material in a photocuring resin liquid, thereby enabling applications of mass production.

According to a fluorescent material for multiphoton fluorescence microscope and a multiphoton fluorescence microscope apparatus of the present invention, nonlinear effects of the two-photon absorption can be utilized to obtain high resolution in an optical axis direction. The material and apparatus can be used not only for industrial applications, but also for three-dimensional micro imaging of a biological cell and the like.

BEST MODE FOR CARRYING OUT THE INVENTION

In a photosensitized composite material according to the present invention, multiphoton absorption compounds, which have a molecular structure enabling multiphoton absorption, are linked to the surface of a fine metal particle generating an enhanced surface plasmon field in resonance with a multiphoton excitation wavelength.

The multiphoton excitation wavelength is preferably a two-photon excitation wavelength. The multiphoton absorption compound is preferably a two-photon absorption compound.

The surface of the fine metal particle and the multiphoton absorption compounds are preferably linked by linking groups having a site linking to the surface of the fine metal particle and a site linking to the multiphoton absorption compound. The multiphoton absorption compound preferably has a molecular structure preliminarily linked to the site, which links to the multiphoton absorption compound, of the linking group having a site linking to the surface of the fine metal particle and a site linking to the multiphoton absorption compound. The linking group is preferably an alkylene group.

Specifically, in the photosensitized composite material according to the present invention, an enhanced surface plasmon field is used to sensitize the multiphoton absorption. Accordingly, the material is highly sensitized more than ever, and it is possible to achieve practical applications by utilizing multiphoton absorption, especially two-photon absorption and a small, inexpensive laser. This photosensitized composite material with high efficiency is easily used as a highly sensitive thin film or a bulk and applied to various technologies (e.g., materials and devices) utilizing multiphoton absorption characteristics.

Figure 1A:
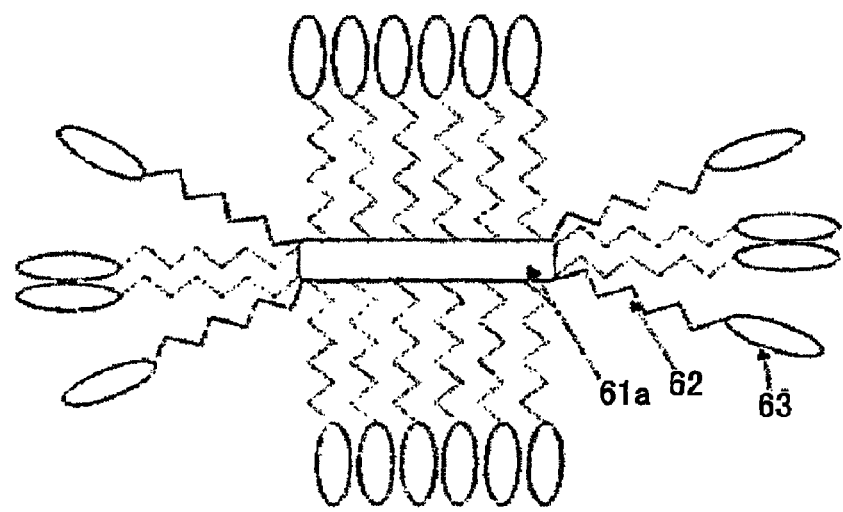
FIGS. 1A and 1B are schematic views for explaining examples of a structure of a photosensitized composite material according to the present invention.
Figure 1B:
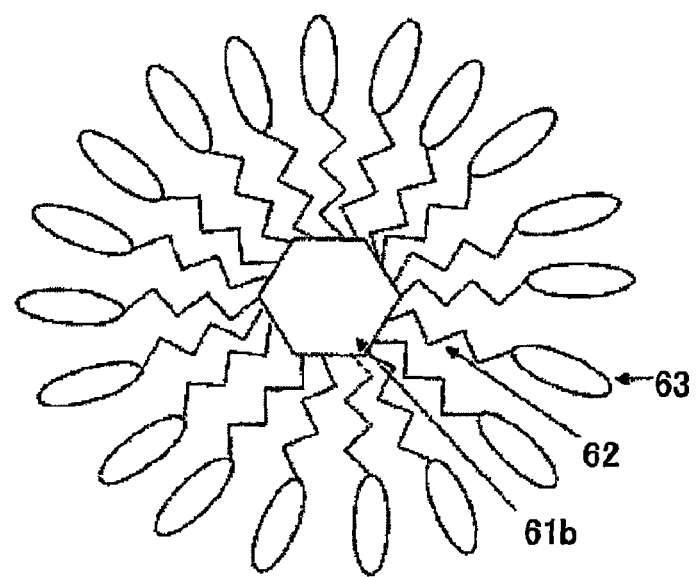

FIGS. 1A and 1B are schematic views showing examples of a structure of the photosensitized composite material according to the present invention.

In FIGS. 1A and 1B, the reference numeral 61a denotes a fine metal particle (nanorod), the reference numeral 62 denotes a linking group, the reference numeral 63 denotes a multiphoton absorption compound, and the reference numeral 61b denotes a fine metal particle (granular). The multiphoton absorption compound 63 is synonymous with the aforementioned multi (two) photon absorption compound. Although FIGS. 1A and 1B show examples of fine metal particles with a rod shape and a hexagon shape, the fine metal particle is not limited to these as along as the particle absorbs light having a multi (two) photon excitation wavelength according to the present invention.

In FIGS. 1A and 1B, a fine metal particle is disposed in the center and linked to skeletons of multi (two) photon absorption compounds by linking groups (e.g., alkylene groups) having a site linking to the surface of the fine metal particles and a site linking to the multiphoton absorption compounds. In other words, molecules of a multi (two) photon absorption compound are linked to the surface of the fine metal particle in the same manner as that a surfactant envelops the surface of the fine metal particles.

Accordingly, the multiphoton absorption compounds are placed close to the enhanced plasmon field from the fine metal particle, and it is possible to control with high precision the distance between the multiphoton absorption material and the enhanced plasmon field. Sensitization effects with high efficiency can be obtained. Moreover, the multi (two) photon absorption compounds are generally hydrophobic and have high affinity with an organic solvent. The composite material can be coated by solvent coating.

As described above, in the photosensitized composite material of the present invention, the multi (two) photon absorption compounds having a molecular structure, which enables the multi (two) photon absorption, are linked to the surface of the fine metal particle generating the enhanced surface plasmon field in resonance with a multi (two) photon excitation wavelength.

The photosensitized composite material of the present invention is detailed hereinafter.

The fine metal particle constituting the photosensitized composite material of the present invention causes resonance absorption called plasmon absorption when the fine metal particle is irradiated with light.

For example, gold colloid, in which fine spherical gold particles are dispersed in water, has single absorption around 530 nm and exhibits vivid red color. This fine spherical metal particle is used as a red colorant for stained glass and the like.

Meanwhile, a gold nanorod, a type of a fine metal particle, is a fine rod gold particle. By controlling the aspect ratio thereof (major axis/minor axis: R), it is possible to absorb light having any wavelength between visible light and near infrared radiation. As the aspect ratio becomes large, the resonant (absorbing) wavelength shifts toward longer wavelengths. Accordingly, the gold nanorod, a type of a fine metal particle, can be preferably used in the present invention.

Figure 2:
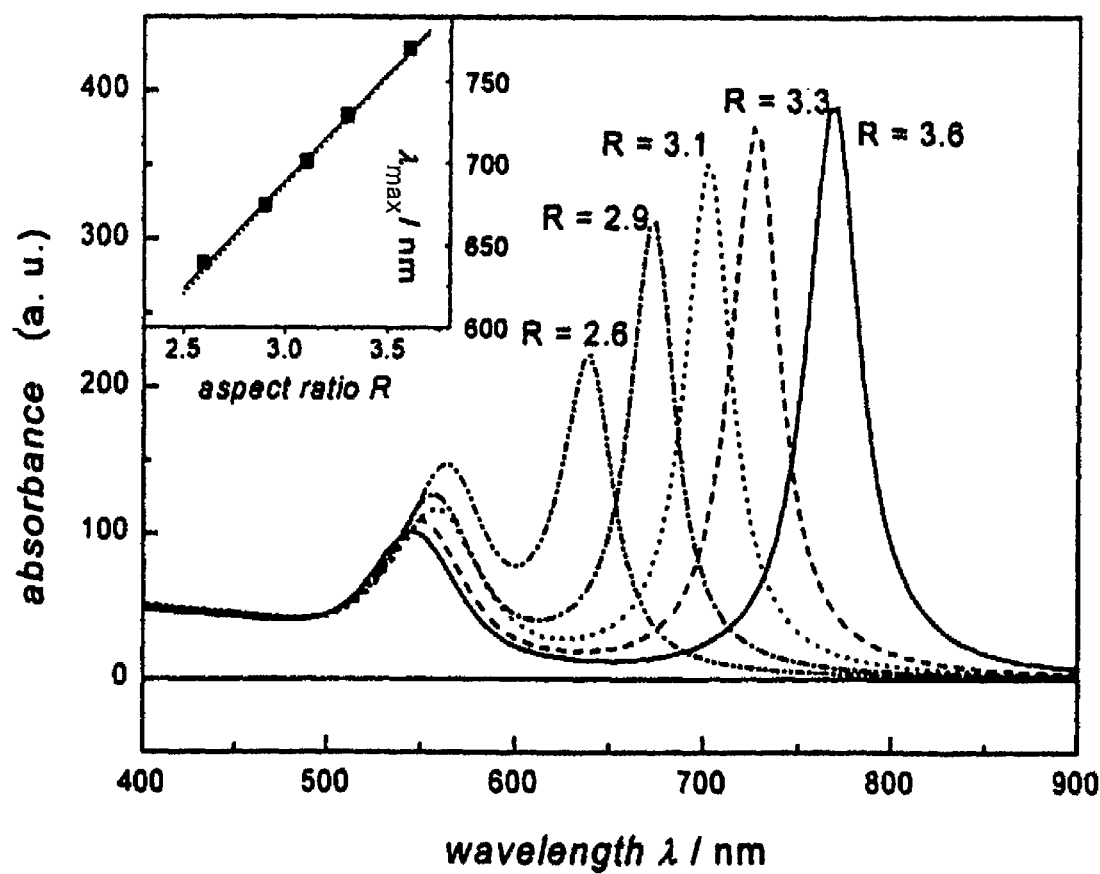
FIG. 2 is a view showing a relationship between a wavelength and absorbance spectrum when an aspect ratio (R) of a gold nanorod is used as a parameter, and a relationship between (R) and a wavelength ($\lambda$ max).

FIG. 2 is a view showing a relationship between a wavelength and resonant (absorptive) spectrum when an aspect ratio (R) of a gold nanorod is used as a parameter, and a relationship between (R) and a wavelength ($\lambda$ max).

As described above, the gold nanorod has a wide range of wavelength selection. Specifically, when the gold nanorod is used for an optical device, the major axis/minor axis of the gold nanorod is controlled so that the resonant (absorptive) wavelength conforms to the used wavelength, thereby further improving sensitization effects.

Fine particles generating an enhanced plasmon field generate independent enhanced plasmon fields by excitation light. When the fine particles are adjacent to each other, enhanced fields are superposed, and a larger enhanced plasmon field is generated in a gap between the fine particles. This large enhanced plasmon field is significantly generated in fine particle aggregates and an approximate dimer where two fine particles are adjacent each other.

It is known that the enhanced surface plasmon field by a fine metal particle is generally limited to a region approximately 100 nm or less from the surface. When the particle has shape anisotropy like the gold nanorod and the major axis thereof exceeds 100 nm, the enhanced field expands to the area of a resonant wavelength of the rod. As the enhanced field is closer to the fine metal particle, enhancement effects thereof becomes larger. In consideration of energy transfer and electron transfer from the multiphoton absorption compound, particularly two-photon absorption compound in the configuration of the present invention, deactivation occurs and adverse effects are exerted when the two-photon absorption compound (e.g., main skeleton of two-photon absorption dye) and the fine metal particles are attached, contacted, or too close to each other.

In the photosensitized composite material of the present invention, a fine metal particle and multiphoton absorption compounds are linked by linking groups (e.g., alkylene groups) having a site linked to the surface of the fine metal particle generating the enhanced surface plasmon field and a site linked to multiphoton absorption compound having a molecular structure capable of multiphoton absorption. A two-photon absorption compound is preferable for the multiphoton absorption compound.

Hereinafter, a "multi (two) photon absorption compound" may be referred to as a "multi (two) photon absorption material."

Specifically, it is possible to control a chain length of a linking group in the present invention. In the photosentisized composite material or the highly efficient multi (two) photon sensitized composite material, the multi (two) photon absorption material can be disposed in a distance where efficiency of the enhanced plasmon field is optimized.

It is possible to sensitize more efficiently and certainly when the photosensitized composite material in which a chain length of the linking group of the present invention is controlled than when multi (two) photon absorption material and fine metal particle are simply mixed to obtain multi (two) photon enhancement.

The multiphoton absorption compound (multi (two) photon absorption material) may have a molecular structure preliminary linked to the site, which links to the multi (two) photon absorption material, of the linking group having a site linking to the surface of a fine metal particle and a site linking to the multi (two) photon absorption material.

When the linking group is preliminarily linked to the multi (two) photon absorption material, the main skeleton of the multi (two) photon absorption material is optimally linked to a fine metal particle through a linking group having a predetermined length of alkyle chain or the like so that the enhanced plasmon field occurs in a region where the efficiency thereof is maximized. Specific examples of the linking group preliminary linked to the multi (two) photon absorption material include an alkylthiol group having 4 to 20 carbon atoms and an alkyl amino group.

Moreover, a branched alkyl group is more preferable than a linear alkyl group for the linking group (e.g., a linking group preliminarily linked to a multi (two) photon absorption material).

It is because the number of sites of the multi (two) photon absorption material surrounding the fine metal particle is desired to be larger. Thus, plasmon enhancement efficiency can be increased more by linear alkyl groups having less steric hindrance and a large number of bonds than by branched alkyl groups having less number of bonds at sites of multi (two) photon absorption material due to steric hindrance.

For the same reason, the linking group preferably contains an aromatic group site such as an aryl group rather than a linear alkyl group. Alkylene groups having less branches, substituents containing triple bonds, and the like are expected to exert the same effects as the linear alkyl groups. However, the linear alkyl groups are most preferable in terms of material procurement, synthesis, and productivity.

Examples of the bonds include covalent bonds, ionic bonds, and electrostatic bonds. The covalent bonds are most preferable since cohesive strength is strong. It is because weak cohesive strength causes elimination of bonding site (bonding group) of the linking group from the fine metal particle when the fine metal particles and the linking groups are re-dispersed in a solvent or the like again. As a result, aggregation occurs in the solution. Covalent bonds hardly cause aggregation and thus is more preferable.

A distance between the surface of fine metal particle and the skeleton of multi (two) photon absorption material is from 1 nm to 1000 nm, preferably from 5 nm to 100 nm, and more preferably from 10 nm to 80 nm.

It is known that a gold nanorod and a two-photon absorption material are mixed for sensitization (e.g., JP-A No. 2006-330683). When a film is formed based on this structure, several two-photon absorption material and a gold nanorod are in contact (attached) with each other, in other words, they are just in contact with each other instead of bonded with each other as defined in the present invention. When they are just in contact with each other and the film is washed with an organic solvent or the like, two-photon absorption materials and gold nanorods (fine metal particle) are easily separated.

By contrast, when the photosensitized composite material of the present invention is washed with an organic solvent or the like, most of the bonds between the multi (two) photon absorption material and a fine metal particle are kept and not separated.

It is difficult to dissolve or disperse the fine metal particle itself in water or an organic solvent. Thus, the fine metal particle is dispersed in a solvent with a dispersant.

Typical dispersants include alkyl ammonium salts as described in JP-A 2005-68447. Specific examples of the dispersant include hexadecyltrimethylammoniumbromide, didodecyldimethylammoniumbromide, tetraoctylammoniumbromide, and tetrahexylammoniumbromide. Moreover, alkylthiol may be used as a dispersant.

In the present invention, the fine metal particle itself is resonant with (absorbs) light, in other words, a multi (two) photon excitation wavelength. Thus, enhancement effects can be greatly exerted, compared with, for example, a simple mixture of the fine metal particle and the multiphoton absorption compound and the structure in which a styrylbenzene two-photon material is linked to the surface of a fine silver particle.

When the fine metal particle extremely absorbs light having the multi (two) photon excitation wavelength, transparency with respect to light, which is an advantage of the multi (two) photon absorption, is reduced. Thus, absorption by the fine metal particle in the present invention is from 0.01% to 30% and more preferably 0.1% to 20% with respect to one-photon absorption by the multi (two) photon absorption material.

To control the absorption amount of the multi (two) photon excitation light by the fine metal particle, it is possible to mix a multi (two) photon absorption material not linked to a fine metal particle or a fine metal particle not linked to a multi (two) photon absorption material. The multi (two) photon absorption material may have the same skeleton as the multi (two) photon absorption material linked to a fine metal particle. The shape of the fine metal particle not linked to the multi (two) photon material may be the same as or different from the shape of the fine metal particle in the center of the composite material in which the multiphoton absorption material is linked to the surface of the fine metal particle.

The absorption, which is based on the resonance with light having a multiphoton excitation wavelength, of the fine metal particle generating an enhanced surface plasmon field in resonance with the multiphoton excitation wavelength in the present invention means absorption at a region between absorption ends of a long wavelength side and a short wavelength side with the absorption peak in its center obtained by a spectrophotometer or the like. The absorption means absorption covering a wavelength region having an absorption amount of 0.1% or more and more preferably 0.5% or more with respect to the absorption peak.

A composite material, in which a fine metal particle and multi (two) photon absorption compound (multi (two) photon absorption material) in the present invention are linked, is manufactured as follows: for example, a fine metal particle is dispersed in water under presence of a dispersant to prepare an aqueous fine metal particle dispersion; an organic solvent is added to the aqueous fine metal particle dispersion; the obtained dispersion and multi (two) photon absorption material having a thiol group and an amino group at its end are mixed; the dispersant on the surface of the fine metal particle is substituted with the multi (two) photon absorption material to obtain a fine metal particle-multi (two) photon absorption material linked composite material.

By drying the solvent in the dispersion to obtain powder, a photosensitized composite material can be obtained. When this composite material is re-dispersed in an organic solvent to make a film by a conventional coating method, the composite material can be applied to various materials, devices, electronics elements, and the like.

Example of the multi (two) photon absorption material include organic compounds having multi (two) photon absorbance such as conjugated compounds (e.g., styrylbenzene), cyclic compounds (e.g., porphyrin), metal chelate compounds (e.g., azo metal chelate), and fluorescent dyes (e.g., rhodamine and coumarin).

As described above, in a simple fine spherical particle, the light exciting a multi (two) photon absorption material generally does not have a resonant (absorbing) wavelength. Accordingly, in the present invention, as previously mentioned, a gold nanorod which can easily control the absorption wavelength is used. Other than the gold nanorod, fine metal particles with various shapes, such as nanowire, nanoprism, nanotube, nanocube, nanobox, hexagon nanoparticles, multipod nanoparticles, and resin fine metal particles, can be used as the fine particles which can match a two-photon excitation wavelength and the resonant wavelength of the fine metal particle. Typical examples of the metal material which can form these shapes include gold and silver.

Note that the fine metal particles having these shapes are described in "Recent Advances on Design and Applications of Plasmonic Nanomaterials" (Jyun Yamada (editor), CMC Publishing Co., Ltd, P18-P22).

Applications of the photosensitized composite material of the present invention include a three-dimensional memory material (a multi (two) photon absorption optical recording material), an optical power limiting material, a photocuring material, and a fluorescent material for a multiphoton fluorescence microscope. In addition, the photosensitized composite material can be used to configure a three-dimensional recording medium, an optical power limiting element, a stereolithography system, and a multiphoton fluorescence microscope apparatus. Hereinafter, the details are described.

[Multi (Two) Photon Absorption Optical Recording Material and Three-Dimensional Recording Medium]

An optical recording material containing an optical sensitized composite material of the present invention, in which fine metal particles (e.g., gold nanorods) and multi (two) photon absorption materials are linked, can be directly applied to a base by a spin coater, a roll coater, a bar coater, or the like. Alternatively, the material can be casted as a film and laminated on a base by a normal method. In addition, these can be employed to prepare a multi (two) photon absorption optical recording material.

The "base" means any natural or synthetic support, suitably has a form of a soft or rigid film, sheet, or a board. The base may be made of, for example, polyethylene terephthalate, resin undercoated polyethylene terephthalate, polyethylene terephthalate subjected to flame or electrostatic discharge, cellulose acetate, polycarbonate, polymethylmethacrylate, polyester, polyvinyl alcohol, or glass.

Moreover, a guide groove for tracking and address information may be given to the base in advance.

The applied solvent can be removed by evaporation. The solvent may be subjected to heat or a reduced pressure to be evaporated and removed.

Moreover, a protective layer (an intermediate layer) may be formed on a film, which is made of multi (two) photon absorption optical recording materials, to block oxygen and prevent crosstalk between layers. The protective layer (intermediate layer) is made of polyolefin such as polypropylene or polyethylene, polyvinyl chloride, polyvinilidene chloride, polyvinyl alcohol, or polyethylene terephthalate. Alternatively, the protective layer may be formed by that a plastic film such as cellophane or a board is electrostatically in contact or laminated by an extruder to be pasted, or the polymer solution is applied. Moreover, it is possible to apply an adhesive or a liquid substance between a protective layer and a photosensitive film and/or a base and a photosensitive film to enhance airtightness. Furthermore, a guide groove for tracking and address information may be added to a protective layer (intermediate layer) in advance between photosensitive films.

When a predetermined layer of the above three-dimensional multilayered optical recording medium is focused to perform recording/reproducing, a three-dimensional recording medium of the present invention functions. Even if a protective layer (intermediate layer) does not separate the layers, it is possible to perform three-dimensional recording in a depth direction by the multi (two) photon absorption dye characteristics.

Hereinafter, specific examples of three-dimensional recording media (three-dimensional multilayered optical memory) are described as preferred embodiments. The present invention is not limited to these embodiments and can have any structure as long as three-dimensional recording (recording in plane and thickness directions) is enabled.

Figure 3:
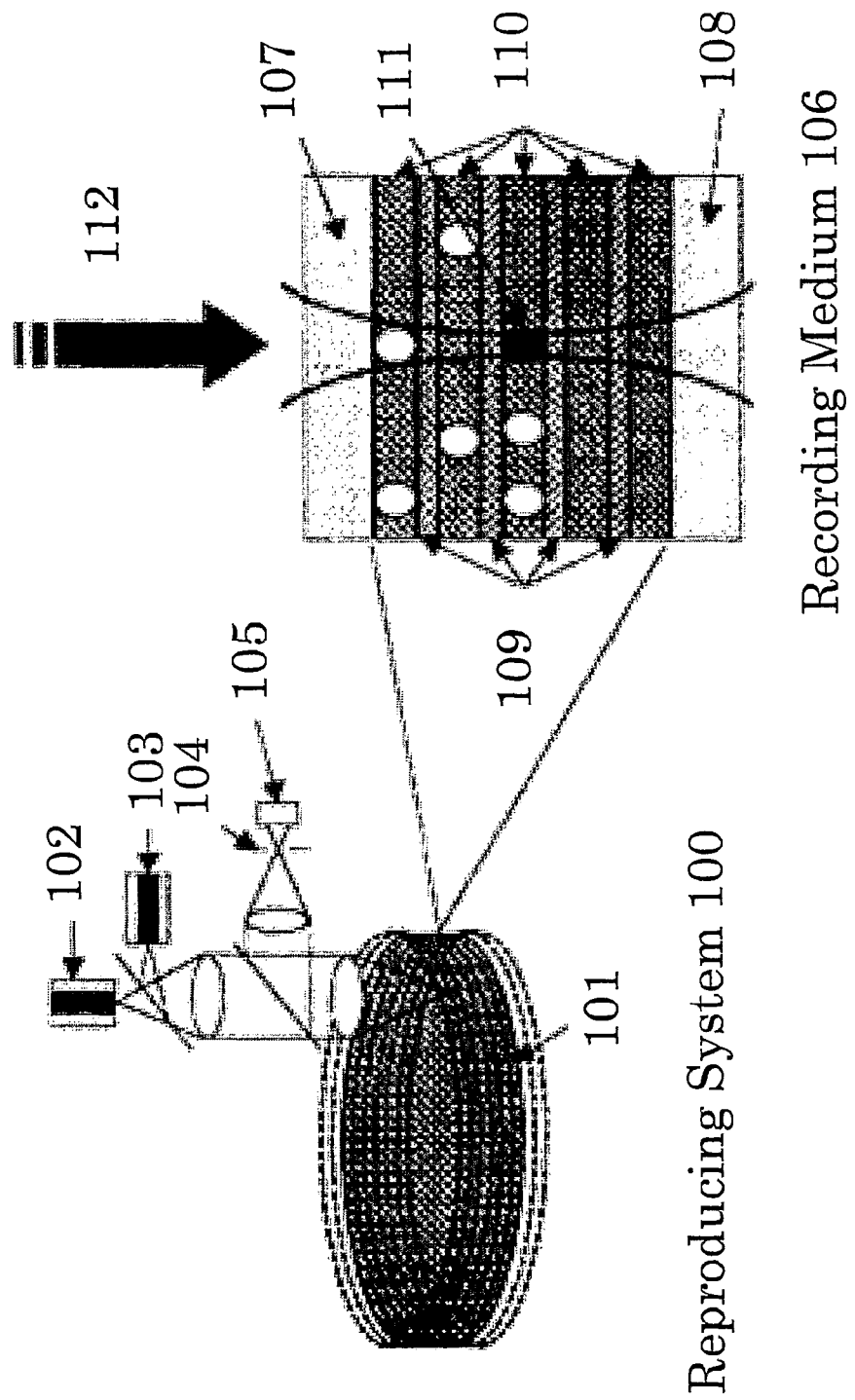
FIG. 3 is a schematic view showing an example of a recording/reproducing system of a three-dimensional multilayered optical memory and an example of a recording medium according to the present invention.

FIG. 3 is a schematic view showing an example of a recording/reproducing system of a three-dimensional multilayered optical memory and an example of a recording medium according to the present invention.

In FIG. 3, the reference numeral 100 denotes a reproducing system, the reference numeral 101 denotes a multilayered disc, the reference numeral 102 denotes a recording laser beam, the reference numeral 103 denotes a reading laser source, the reference numeral 104 denotes a pinhole, the reference numeral 105 denotes a detector, the reference numeral 106 denotes a recording medium, the reference numeral 107 denotes a first base, the reference numeral 108 denotes a second base or a reflective layer, the reference numeral 109 denotes an intermediate layer, the reference numeral 110 denotes recording layers, the reference numeral 111 denotes a recording bit, and the reference numeral 112 denotes a recording laser beam.

In the recording medium 106 shown in FIG. 3, the recording layers 110 and the intermediate layers 109 (protective layers) are alternately laminated on a flat support (the first base 107), and each layer is formed by spin coating. Multi (two) photon absorption compounds (e.g., two-photon absorption compounds) of the present invention are used for the recoding layers, and the intermediate layer (protective layers) prevents a crosstalk. FIG. 3 shows only 5 layers, but approximately 50 layers or more may be laminated.

It is preferred that the thickness of the recording layer 110 be from 0.01 µm to 0.5 µm and the thickness of the intermediate layer 109 be from 0.1 µm to 5 µm. When the recording medium has this structure, it is possible to achieve mass storage optical recording in terabytes with the same size as CD/DVD widely used at present. Moreover, a second base 108 (protective layer) the same as the first base 107 or the reflective layer 108 composed of a material with high reflectivity is provided in accordance with data reproducing method such as transmission or reflection.

A single beam is used for recording, and ultrashort pulse light of femtosecond order can be utilized in this case. Light having a wavelength different from that of a beam used for data recording or low power light having the same wavelength can be used for reproducing. Recording and reproducing can be performed in both bit unit and a depth direction unit. Parallel recording/reproducing utilizing a surface illuminant, two-dimensional detector, and the like are effective to enhance a transfer rate.

Moreover, in a bulk recording layer (not shown) without an intermediate layer, hologram page data is collectively recorded and reproduced in a depth direction to enhance a transfer rate of the recording/reproducing.

Note that the three-dimensional multilayered optical memory formed similarly in accordance with the present invention may be a card, tape, or drum laminated medium although not being shown.

(Optical Power Limiting Material and Optical Power Limiting Element)

Next, applications of the photosensitized composite material of the present invention to an optical power limiting material and an optical power limiting element are specifically described.

In optical communication and optical information processing, optical control such as modulation and switching is required to transfer signals of information or the like by light. This type of optical control conventionally employs an electrical-optical control method using an electric signal. However, the electrical-optical control method has limitations on bands due to CR time constant of an electrical circuit and on a processing speed due to a response speed of an element itself and different speeds between an electric signal and an optical speed. Thus, an optical-optical control technology which controls an optical signal by an optical signal is very important to make full use of advantages of light such as its broad band and high speed.

To meet the demand, the photosensitized composite material of the present invention, the multi (two) photon absorption material, is used for an optical power limiting material and processed into a predetermined confirmation to prepare an optical element. The optical element using the multi (two) photon absorption material of the present invention utilizes optical changes in, for example, transmittance, index of refraction, and an absorption coefficient due to light application to modulate light intensity and frequency without an electronic circuit technology. Thus, the optical element can be applied to an optical switch and the like in optical communication, optical switching, an optical computer, optical interconnection, and the like.

Figure 4:
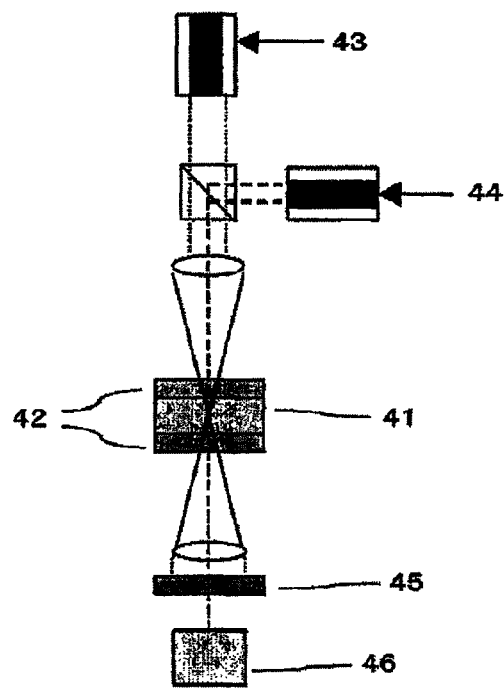
FIG. 4 is a schematic view showing an example of an optical power limiting element which performs optical switching on signal light having a wavelength capable of causing one-photon excitation by two-photon excitation of a two-photon absorption functional material according to the present invention.

The optical power limiting element of the present invention utilizing optical characteristics changes due to two-photon absorption, a type of multiphoton absorption, has an excellent response speed, compared with an optical power limiting element formed by a normal semiconductive material or using one-photon excitation. The optical power limiting element has high sensitivity so that an optical power limiting element has a high S/N ratio and excellent signal characteristics. An optical waveguide is known as an optical power limiting element. This optical waveguide applies light to a material to change the index of refraction to focus and forms a distribution of index of refraction. This configuration is applicable to the present invention. FIG. 4 is a schematic view showing an example of an optical power limiting element which causes two-photon excitation on the two-photon absorption material of the present invention by control light having a wavelength, which can cause two-photon excitation, to optically switching signal light having a wavelength, which can cause one-photon excitation. In this example, an optical power limiting element 41 is formed of a two-photon absorption composite material of the present invention and sandwiched between protective layers 42. However, the present invention is not limited to this configuration.

The optical power limiting element optically switches signal light 44 by causing two-photon excitation on the optical power limiting element due to control light 43. The control light utilizes two-photon process, and the signal light utilizes one-photon process. Thus, these lights have different wavelengths, and a color filter 45 can separate the control light and signal light. A detector 46 detects the separated signal light. By this configuration, it is possible to achieve both a high-speed response and an S/N ratio of the optical-optical control technology.

(Photocuring Material and Stereolithography System)

Figure 5:
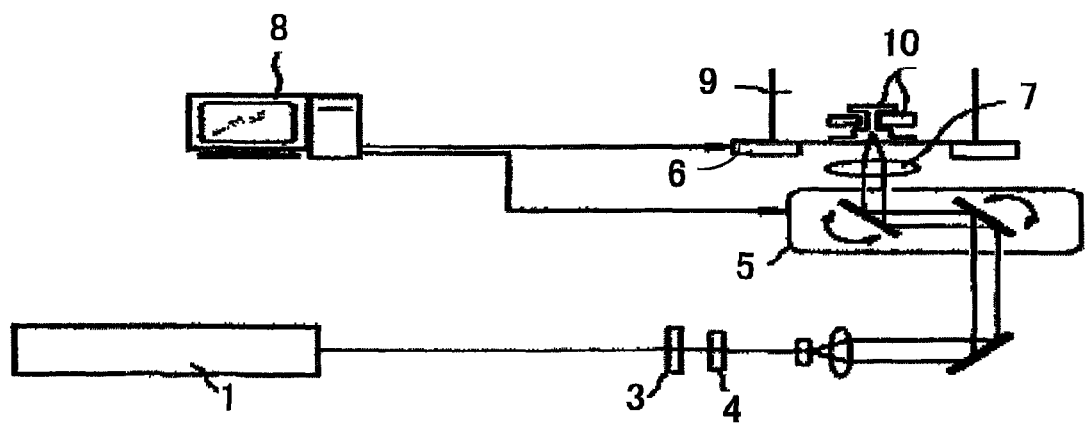
FIG. 5 is a schematic view showing an example of a stereolithography system for explaining stereolithography according to the present invention.

Stereolithography is described referring to an apparatus (stereolithography system) for multi (two) photon stereolithography shown in a schematic view of FIG. 5.

Light having transparency to a photocuring resin and emitted from a near infrared pulse laser light source 1 is transmitted through a mirror scanner 5. The light is condensed on a photocuring resin liquid 9 containing a photosensitized composite material of the present invention by using a lens. A laser spot is scanned, multi photon absorption (e.g., two-photon absorption) is induced to cure a resin only in the vicinity of the focus. Accordingly, it is possible to form a desired three-dimensional structure. By a multi (two) photon micro stereolithography using this stereolithography system, it is possible to form a fine, ultra-precise three-dimensional structure.

Specifically, a pulse laser beam is condensed by a lens to form a region having a high density of photons in the vicinity of a point of focus. At this time, the total number of photons passing through each section of the beam is constant. When a beam is two-dimensionally applied on the focusing surface, the sum of light intensity in each section is constant. However, the probability of multi (two) photon absorption is proportional to the square of light intensity. Thus, a region having a high probability of multi (two) photon absorption is formed only in the vicinity of a focus point having large light intensity.

When a pulse laser beam is condensed by a lens and multi (two) photon absorption is induced, light absorption is limited in the vicinity of the focus point. Thus, it is possible to locally cure the resin. A Z stage 6 and a galvanometer mirror can freely move the focal point in the photocuring resin liquid. Accordingly, it is possible to freely form a desired three-dimensional product (stereolithography product 10) in a photocuring resin liquid. Note that the reference numeral 3 denotes a shutter which timely controls an excessive light amount; the reference numeral 4 denotes an ND filter; the reference numeral 7 denotes a lens serving as a condensing unit; and the reference numeral 8 denotes a computer in FIG. 5.

Specifically, when the surface of the fine metal particle of the present invention contains a photosensitized composite material in which multiphoton absorption compounds are linked, in other words, a highly sensitive multiphoton absorption composite material, multi (two) photon absorption efficiency is further improved.

The multiphoton stereolithography, especially the two-photon stereolithography, has the following features:

(1) Process resolution exceeding diffraction limit: it is possible to achieve process resolution exceeding diffraction limit of light by nonlinearity with respect to light intensity of two-photon absorption.
(2) Ultra high speed formation: when the two-photon absorption is utilized, a photocuring resin is not principally cured in a region outside the focal point. By increasing the applying light intensity, the scanning speed of a beam can be faster. Thus, the formation speed can be approximately 10 times faster.
(3) Three-dimensional processing: the photocuring resin can be transparent to the near infrared light induced by two-photon absorption. Accordingly, when the light in condensed deep inside the resin, the inside can be cured. In the conventional method, when the beam is condensed deep inside, the light intensity of the focal point is reduced by light absorption and it is difficult to cure the inside. By contrast, the present invention can surely overcome this problem.
(4) High yield: the viscosity and surface tension of the resin destroys and deforms the stereolithography product in the conventional method. However, stereolithography is performed inside the resin, and this problem can be overcome in the present method.
(5) Application to mass production: by utilizing ultra high speed stereolithography, a large number of parts or movable mechanisms can be manufactured successively in a short period of time.

Herein, for example, the photocuring resin for the two-photon stereolithography changes into a strongly linked solid by that functional groups of a liquid raw material cause polymerization through a photosensitized composite material by applying light.

Main components of the raw material are, for example, a resin component composed of an oligomer and a reactive diluent, a photosensitized composite material, and a photopolymerization initiator. The oligomer is a polymer having a degree of polymerization approximately from 2 to 20 and a large number of reactive groups at its end. Moreover, a reactive diluent is added to control viscosity, hardness, and the like. When light is applied, the photosensitized composite material causes two-photon absorption of the light. Subsequently, reactive species are generated in the polymerization initiator through the photosensitized composite material. The oligomer and the reactive groups of the reactive diluent are activated, a chain polymerization reaction occurs to form three-dimensional links. Thus, the resin changes into a solid resin having a three-dimensional network structure in a short period of time. Moreover, it is possible to perform highly sensitive, ultraprecise three-dimensional processing deep inside through the photosensitized composite material, instead of generating reactive species directly in the polymerization initiator by light application.

The photocuring resin is used for photocuring ink, a photo adhesive, laminated stereolithography, and the like, and resins having various characteristics have been developed. Especially in the laminated stereolithography, it is important that (1) the reactivity is good; (2) volume contraction is small upon curing; (3) mechanical characteristics are excellent after curing; and the like.

These characteristics are also important in the present method. Accordingly, the resin developed for the laminated stereolithography, which is activated and polymerized by the photosensitized composite material (polymerization initiator) having multi (two) photon absorption characteristics, can be used as a photocuring resin for multi (two) photon stereolithography in the present invention. Specifically, acrylate and epoxy photocuring resins are often used, and a urethane-acrylate photocuring resin is particularly preferable.

In the technology related to stereolithography in the present invention, for example, a pulse laser beam is subjected to interference exposure on a sensitive polymer film containing a photosensitized composite material without passing through a mask. It is important that the pulse laser beam in this case has a wavelength which exerts sensitive function through the photosensitized composite material in the sensitive polymer film. Accordingly, it is necessary to appropriately select the wavelength region of the pulse laser beam in consideration of the photosensitized composite material and in accordance with the types of the sensitive polymers or types of groups or sites which exert sensitive function in the sensitive polymer.

It is possible to exert sensitive function of the sensitive polymer film by utilizing multi (two) photon absorption process from the application of the pulse laser beam although the wavelength of the pulse laser beam from the light source is not in a wavelength region exerting sensitive function of the sensitive polymer film.

A method for subjecting the pulse laser beam to interference exposure on the surface of the photosensitive polymer film without passing through a mask is described in, for example, JP-A 2005-134873.

Specifically, when the pulse laser beam from the light source is condensed and the condensed pulse laser beam is applied, multiphoton absorption (e.g., two-photon absorption, three-photon absorption, four-photon absorption, and five-photon absorption) occurs. Even if the wavelength of the pulse laser beam from the light source is not in a wavelength region exerting photosensitive function on a photosensitive polymer film, the pulse laser beam of the wavelength region, which exerts photosensitive function on the photosensitive polymer film, is substantially applied through the photosensitized composite material. The wavelength of the pulse laser beam subjected to interference exposure can be appropriately selected depending on application conditions as long as the pulse laser beam is substantially in a wavelength region exerting photosensitive function on the photosensitive polymer film.

The multi (two) photon absorption sensitization using the photosensitized composite material of the present invention has a high sensitivity of multi (two) photon absorption, compared with when only a conventional two-photon absorption material (two-photon absorption initiator or two-photon absorption photosensitization material) is used. Thus, it is possible to perform high-speed lithography and use a small, inexpensive laser source as a pumping source. This leads to practical applications with mass production.

(Fluorescent Material for Multiphoton Fluorescence Microscope and Multiphoton Fluorescence Microscope Apparatus)

Figure 6:
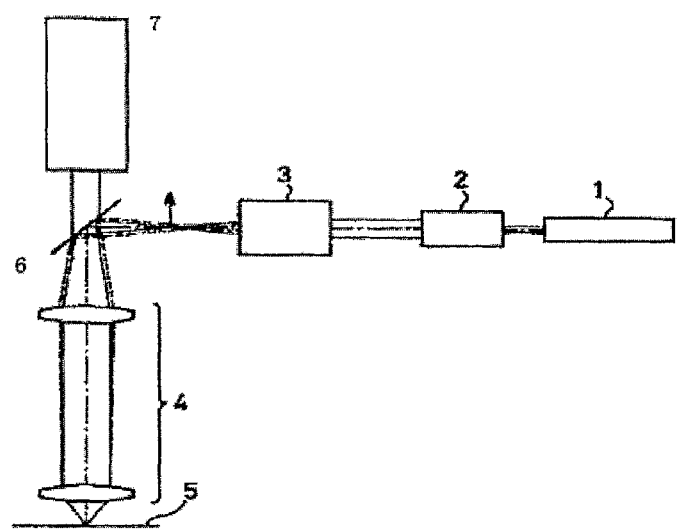
FIG. 6 is a schematic view showing an example of basic configuration of two-photon excitation laser scanning microscope according to the present invention.

A multiphoton fluorescence microscope apparatus (multi (two) photon excitation laser scanning microscope) is a microscope in which a near infrared pulse laser beam is condensed on the surface of a sample to scan and an image is obtained by detecting fluorescence generated by excitation of the surface due to the multi (two) photon absorption. FIG. 6 is a schematic view showing a basic configuration of a two-photon excitation laser scanning microscope.

The two-photon excitation laser scanning microscope shown in FIG. 6 is provided with a laser source 1 configured to generate a subpicosecond monocolor coherent light pulse of a near infrared wavelength; a luminous flux conversion optical system 2 configured to change a luminous flux from a laser source into a desired size; a scanning optical system 3 configured to condense the luminous flux converted by the luminous flux conversion optical system on an image surface of an objective lens to scan; an objective lens system 4 configured to project the condensed converted luminous flux on the sample surface 5; and an optical detector 7.

The pulse laser beam is condensed by the luminous flux conversion optical system and the objective lens system through a dichroic mirror 6 to the focal point on the sample surface.

Thus, fluorescence induced by two-photon absorption through the photosensitized composite material in generated on a two-photon absorption fluorescent material in the sample. The sample surface is scanned by a laser beam and fluorescence intensity at each spot is detected by a detector by a photodetector 7 and the like. Based on the positional information, a computer plots a three-dimension fluorescent image. As for scanning mechanism, for example, a laser beam can be scanned by a movable mirror such as a galvanometer mirror. Alternatively, a sample including a two-photon absorption material disposed on a stage may be moved.

By this configuration, it is possible to obtain high resolution in an optical axis direction by utilizing nonlinear effects of the two-photon absorption. When a confocal pinhole board is additionally used, higher resolution (both in the surface and optical axis direction) can be obtained.

The fluorescent dye for a multiphoton fluorescence microscope apparatus dyes the sample or dispersed in the sample. The fluorescent dye can be used not only for industrial applications, but also for three-dimensional micro imaging of a biological cell and the like. The fluorescent dye is desired to be a compound having a large two-photon absorption sectional area.

A photon fluorescence microscope is described in, for example, JP-A 9-230246.

The scanning fluorescence microscope in this case is provided with a laser applying optical system generating collimated light enlarged to a desired size; and a substrate on which a plurality of condensing elements are formed. The focal positions of the condensing elements are disposed to correspond to image positions of an objective lens system. In addition, a beam splitter, which allows the long wavelength to pass through and reflects a short wavelength, is disposed between the objective lens system and a substrate on which the condensing elements are formed. Fluorescence is generated on the sample surface by the multiphoton absorption. By this configuration, it is possible to obtain high resolution in an optical axis direction by utilizing nonlinear effects of the multiphoton absorption. Furthermore, higher resolution (both in the surface and optical axis direction) can be obtained by using a focal pinhole board.

Similar to the aforementioned optical power limiting element, a multi (two) photon absorption material, the photosensitized composite material of the present invention, can be used for a material having high multi (two) photon absorbance, a thin film, a solid substance dispersed in the photocuring resin and the like, and an optical element. The multi (two) photon absorption material, the photosensitized composite material of the present invention, can be used as the two-photon absorption fluorescence material for the two-photon excitation laser scanning microscope. Compared with the conventional two-photon absorption fluorescent material, the multi (two) photon absorption material has a large two-photon absorption sectional area and thus exerts high two-photon absorption characteristics with low density.

Therefore, according to the present invention, a highly sensitive multi (two) photon absorption material can be obtained. Moreover, it is unnecessary to enhance applied light intensity on the material so that degradation and breakage of the material can be suppressed. Adverse effects on the characteristics of other components in the material can be alleviated.

EXAMPLES

The present invention is further detailed referring to Examples described below. The present invention is not limited to these Examples as long as the invention is within its scope.

Synthesis Example 1 of Gold Nanorod

First, 70 mL of 0.18 mol/L cetyltrimethylammonium bromide aqueous solution, 0.36 mL of cyclohexane, 1 mL of acetone, and 1.2 mL of 0.1 mol/L silver nitrate aqueous solution were mixed and stirred. After 0.3 mL of 0.24 mol/L chloroauric acid aqueous solution was added, 0.3 mL of 0.1 mol/L ascorbic acid aqueous solution was added, and it was confirmed that color of the chloroauric acid became extinct. Thereafter, this solution was transferred to a dish and irradiated with an ultraviolet ray having a wavelength of 254 nm, for 20 minutes by a low-pressure mercury lamp. Accordingly, a gold nanorod dispersion solution having an absorption peak wavelength of approximately 800 nm was obtained. This dispersion solution was set in a centrifuge to separate and sediment the gold nanorod component. This supernatant was removed and water was added to the dispersion solution. Centrifugal separation was repeated several times to remove an excessive dispersant of cetyltrimethylammonium bromide.

Synthesis Example 2 of Gold Nanorod

First, 70 mL of 0.18 mol/L cetyltrimethylammonium bromide aqueous solution, 0.36 mL of cyclohexane, 1 mL of acetone, and 1.0 mL of 0.1 mol/L silver nitrate aqueous solution were mixed and stirred. After 0.3 mL of 0.24 mol/L chloroauric acid aqueous solution was added, 0.3 mL of 0.1 mol/L ascorbic acid aqueous solution was added, and it was confirmed that color of the chloroauric acid became extinct. Thereafter, this solution was transferred to a dish and irradiated with an ultraviolet ray having a wavelength of 254 nm, for 20 minutes by a low-pressure mercury lamp. Accordingly, a gold nanorod dispersion solution having an absorption peak wavelength of approximately 760 nm was obtained. This dispersion solution was set in a centrifuge to separate and sediment the gold nanorod component. This supernatant was removed and water was added to the dispersion solution. Centrifugal separation was repeated several times to remove an excessive dispersant of cetyltrimethylammonium bromide.

Synthesis Example 3 of Gold Nanorod

First, 70 mL of 0.18 mol/L cetyltrimethylammonium bromide aqueous solution, 0.36 mL of cyclohexane, 1 mL of acetone, and 1.5 mL of 0.1 mol/L silver nitrate aqueous solution were mixed and stirred. After 0.3 mL of 0.24 mol/L chloroauric acid aqueous solution was added, 0.3 mL of 0.1 mol/L ascorbic acid aqueous solution was added, and it was confirmed that color of the chloroauric acid became extinct. Thereafter, this solution was transferred to a dish and irradiated with an ultraviolet ray having a wavelength of 254 nm, for 20 minutes by a low-pressure mercury lamp. Accordingly, a gold nanorod dispersion solution having an absorption peak wavelength of approximately 840 nm was obtained. This dispersion solution was set in a centrifuge to separate and sediment the gold nanorod component. This supernatant was removed and water was added to the dispersion solution.

Centrifugal separation was repeated several times to remove an excessive dispersant of cetyltrimethylammonium bromide.

Substitution Treatment Example 1 of Organic Solvent-Dispersed Gold Nanorod

An appropriate amount of ammonia water was added to 10 mL of the aqueous gold nanorod obtained in Gold Nanorod Synthesis Example 1 to adjust a pH from 8 to 9. Subsequently, 10 mL of 100 mmoL mercaptosuccinic acid aqueous solution was added and stirred. As the stirring was continued, 500 mmol tetraoctylammonium bromide and 5 mL of toluene solution was added and fiercely stirred for approximately 30 minutes. The reaction solution was extracted with toluene so that a very small amount of solvent was left. The reactive solution was distilled, filtered, and dried to obtain an organic solvent-dispersed gold nanorod.

Substitution Treatment Example 2 of Organic Solvent-Dispersed Gold Nanorod

An organic solvent dispersion gold nanorod was obtained in the exactly the same manner as in Substitution Treatment Example 1 of Organic Solvent-Dispersed Gold Nanorod except that the aqueous nanorod obtained in Synthesis Example 2 of Gold Nanorod was used instead of the aqueous nanorod obtained in Synthesis Example 1 of Gold Nanorod.

Substitution Treatment Example 3 of Organic Solvent-Dispersed Gold Nanorod

An organic solvent dispersion gold nanorod was obtained in the exactly the same manner as in Substitution Treatment Example 1 of Organic Solvent-Dispersed Gold Nanorod except that the aqueous nanorod obtained in Synthesis Example 3 of Gold Nanorod was used instead of the aqueous nanorod obtained in Synthesis Example 1 of Gold Nanorod.

Preparation Example 1 of Two-Photon Absorption Composite Material

First, 5 mg of the organic solvent dispersion gold nanorod obtained in Substitution Treatment Example 1 of Organic Solvent-Dispersed Gold Nanorod was added to 250 mL of methylene chloride. Second, 200 mg of the two-photon absorption material represented by Structural Formula (1) was added to the dispersion solution and fiercely stirred for 30 hours at room temperature. After stopping the stirring, the solvent in the organic layer was distilled away, and the dispersion solution was subjected to vacuum drying. As a result, the two-photon absorption material was linked to a surface of the gold nanorod via a linking group, and a photosensitized composite material winding the surface of the gold nanorod was obtained.

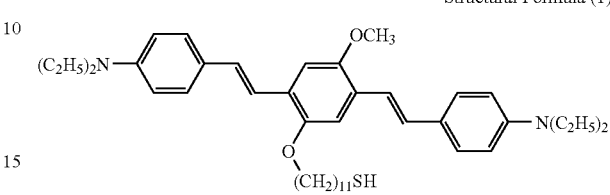

Structural Formula (1)

Preparation Example 2 of Two-Photon Absorption Composite Material

First, 5 mg of the organic solvent dispersion gold nanorod obtained in Substitution Treatment Example 3 of Organic Solvent-Dispersed Gold Nanorod was added to 250 mL of methylene chloride. Second, 300 mg of the two-photon absorption material represented by Structural Formula (2) was added to the dispersion solution and fiercely stirred for 24 hours at room temperature. After stopping the stirring, the solvent in the organic layer was distilled away, and the dispersion solution was subjected to vacuum drying. As a result, the two-photon absorption material was linked to a surface of the gold nanorod via a linking group, and a photosensitized composite material winding the surface of the gold nanorod was obtained.

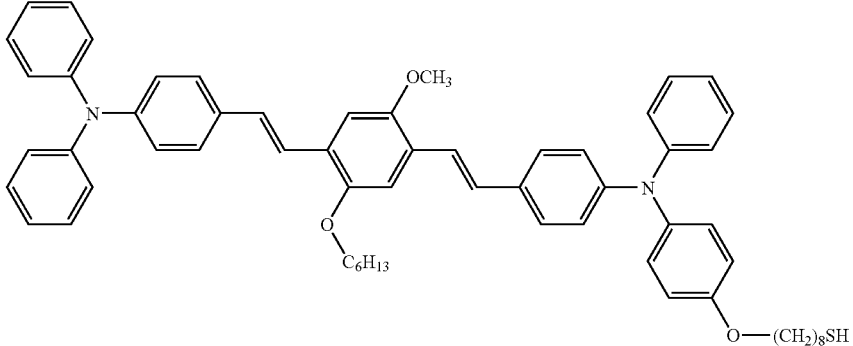

Structural Formula (2)

Preparation Example 3 of Two-Photon Absorption Composite Material

First, 5 mg of the organic solvent dispersion gold nanorod obtained in Substitution Treatment Example 2 of Organic Solvent-Dispersed Gold Nanorod was added to 250 mL of methylene chloride. Second, 350 mg of the two-photon absorption material represented by Structural Formula (3) was added to the dispersion solution and fiercely stirred for 30 hours at room temperature. After stopping the stirring, the solvent in the organic layer was distilled away, and the dispersion solution was subjected to vacuum drying. As a result, the two-photon absorption material was linked to a surface of the gold nanorod via a linking group, and a photosensitized composite material winding the surface of the gold nanorod was obtaned.

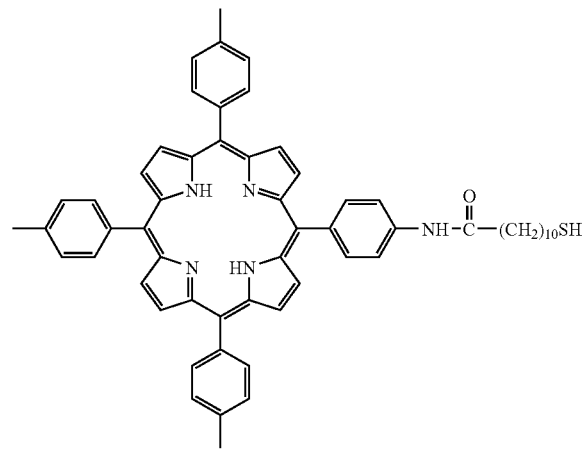

Structural Formula (3)

Preparation Example 4 of Two-Photon Absorption Composite Material

First, 5 mg of the organic solvent dispersion gold nanorod obtained in Substitution Treatment Example 1 of Organic Solvent-Dispersed Gold Nanorod was added to 250 mL of methylene chloride. Second, 350 mg of the two-photon absorption material represented by Structural Formula (4) was added to the dispersion solution and fiercely stirred for 30 hours at room temperature. After stopping the stirring, the solvent in the organic layer was distilled away, and the dispersion solution was subjected to vacuum drying. As a result, the two-photon absorption material was linked to a surface of the gold nanorod via a linking group, and a photosensitized composite material winding the surface of the gold nanorod was obtained.

It was confirmed that the two-photon absorption dye was linked to the gold nanorod in all the photosensitized composite materials in Preparation Examples 1 to 4 of Two-Photon Absorption Composite Material by TEM observation.

Synthesis Example of Fine Gold Spherical Particle

First, 0.37 g of chloroauric acid was added to 30 mL of water. Second, a mixture solution of 2.187 g of tetraoctylammonium bromide and 80 mL of toluene was added and stirred for 2 hours. Furthermore, 0.2 g of 1-dodecanethiol was added and stirred for 1 hour. Subsequently, a solution in which 0.378 g of $NaBH_4$ was dissolved in 20 mL water was dropped to the mixture solution and stirred for 2 hours. This reactant was washed with water several times by using a separating funnel, and a solvent of the organic layer was distilled away to obtain fine spherical gold particles having a particle diameter from 20 nm to 50 nm.

Preparation Example 5 of Two-Photon Linked Composite Material

First, 5 mg of the fine spherical gold particles was re-dispersed in 150 mL of methylene chloride. Second, 20 mg of a two-photon absorption material represented by Structural Formula (1) was added to the dispersion solution and fiercely stirred for 24 hours at room temperature. The stirring was stopped, and the solvent was distilled away, and the dispersion solution was subjected to vacuum drying. As a result, a composite material in which the two-photon absorption material was wound around the fine spherical gold particles was obtained. It was confirmed that there was not resonant absorption of the light in near infrared region in this composite material and that the material was not resonant with so-called multiphoton excitation having a plurality of wavelengths. For the composite material of the present invention, the material needs to be resonant with the multiphoton excitation having a plurality of wavelengths.

Sample Example 1 for Two-Photon (Fluorescence) Characterization

The photosensitized composite material composed of the gold nanorod/two-photon absorption material obtained in Preparation Example 1 of Two-Photon Absorption Composite Material was dissolved in chloroform and spin-coated on Structural Formula (4)

a quartz base so that the film thickness becomes approximately 100 nm. Thus, a thin film sample was obtained.

Sample Example 2 for Two-Photon (Fluorescence) Characterization

The photosensitized composite material composed of the gold nanorod/two-photon absorption material obtained in Preparation Example 2 of Two-Photon Absorption Composite Material was dissolved in chloroform and spin-coated on a quartz base so that the film thickness becomes approximately 100 nm. Thus, a thin film sample was obtained.

Sample Example 3 for Two-Photon (Fluorescence) Characterization

The photosensitized composite material composed of the gold nanorod/two-photon absorption material obtained in Preparation Example 3 of Two-Photon Absorption Composite Material was dissolved in chloroform and spin-coated on a quartz base so that the film thickness becomes approximately 100 nm. Thus, a thin film sample was obtained.

Sample Example 4 for Two-Photon (Fluorescence) Characterization

The photosensitized composite material composed of the gold nanorod/two-photon absorption material obtained in Preparation Example 4 of Two-Photon Absorption Composite Material was dissolved in chloroform and spin-coated on a quartz base so that the film thickness becomes approximately 100 nm. Thus, a thin film sample was obtained.

Sample Comparative Example 1 for Two-Photon (Fluorescence) Characterization

A two-photon absorption material represented by Structural Formula (5) was dissolved in chloroform and spin-coated on a quartz base so that the film thickness becomes approximately 100 nm. Thus, a thin film sample was obtained.

Structural Formula (5)

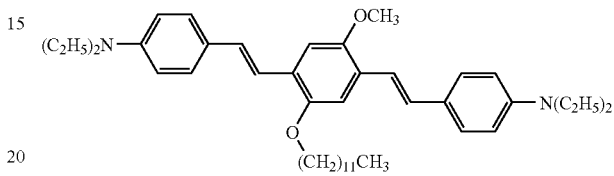

Sample Comparative Example 2 for Two-Photon (Fluorescence) Characterization

A two-photon absorption material represented by Structural Formula (6) was dissolved in chloroform and spin-coated on a quartz base so that the film thickness becomes approximately 100 nm. Thus, a thin film sample was obtained.

Structural Formula (6)

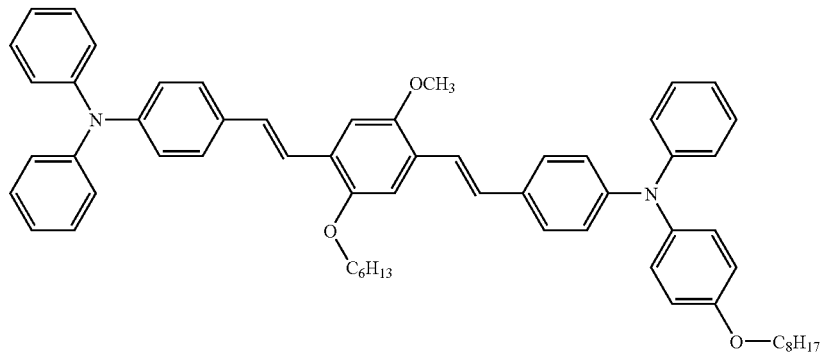

Sample Comparative Example 3 for Two-Photon (Fluorescence) Characterization

A two-photon absorption material represented by Structural Formula (7) was dissolved in chloroform. A small amount of powder obtained in Substitution Treatment Example 1 of Organic Solvent-Dispersed Gold Nanorod was added little by little so as to prepare a solution in which a ratio of an absorption amount of the gold nanorod at 760 nm to the maximum absorption peak of a two-photon absorption material represented by Structural Formula (7) was adjusted to be the same as a ratio of an absorption amount of the gold nanorod at 760 nm to the maximum absorption peak of a two-photon absorption material in Example 3. This solution was spin-coated on a quartz base so that the film thickness becomes approximately 100 nm. Thus, a thin film sample was obtained.

Structural Formula (7)

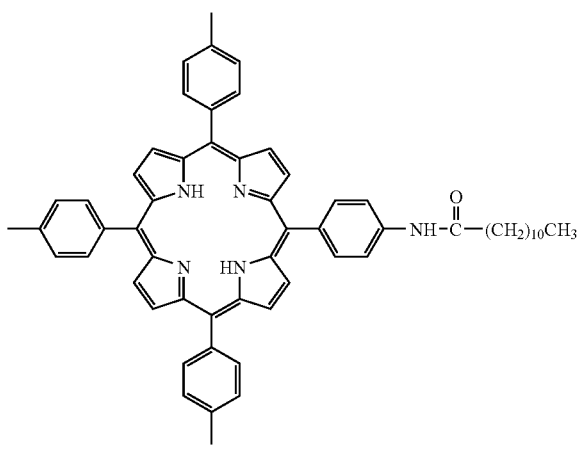

Sample Comparative Example 4 for Two-Photon (Fluorescence) Characterization

A two-photon absorption material represented by Structural Formula (8) was dissolved in chloroform. A small amount of powder obtained in Substitution Treatment Example 1 of Organic Solvent-Dispersed Gold Nanorod was added little by little so as to prepare a solution in which a ratio of an absorption amount of the gold nanorod at 800 nm to the maximum absorption peak of a two-photon absorption material represented by Structural Formula (8) was adjusted to be the same as a ratio of an absorption amount of the gold nanorod at 800 nm to the maximum absorption peak of a two-photon absorption material in Example 4. This solution was spin-coated on a quartz base so that the film thickness becomes approximately 100 nm. Thus, a thin film sample was obtained.

The samples prepared in Examples 1 to 4 and Comparative Examples 1 to 5 were used to evaluate a fluorescence amount (fluorescence intensity) upon two-photon absorption by the following evaluation method.

Evaluation Method of Fluorescence Amount upon Two-Photon Absorption

Figure 7:
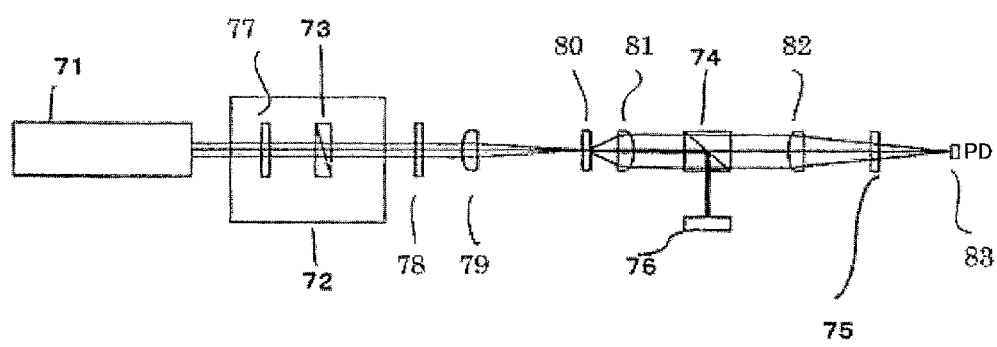
FIG. 7 is a schematic view showing a measurement system used for evaluation of quantity of fluorescence upon two-photon absorption in Examples.

FIG. 7 is a schematic view showing a measurement system used for evaluation of quantity of fluorescence upon two-photon absorption in Examples.

In FIG. 7, the reference numeral 71 denotes a femtosecond laser, the reference numeral 72 denotes an attenuator, the reference numeral 73 denotes a Glan laser prism, the reference numeral 74 denotes a dichroic mirror, the reference numeral 75 denotes an infrared ray cut glass filter, and the reference numeral 76 denotes a beam shield board.

It is not easy to directly measure the two-photon absorption amount of the sample in the photosensitized composite material configuration of the present invention since the excitation light is absorbed and scattered by the fine particles generating the enhanced plasmon field. Accordingly, in the evaluation in the present invention, a two-photon absorption material having fluorescence was used. By relatively comparing fluorescent amounts generated by two-photon absorption materials in the samples, an enhancement degree of the two-photon absorption was measured.

As for the excitation light, an infrared ray femtosecond laser, MAITAI, manufactured by Spectraphysics, Co. Ltd., (repeated frequency: 80 MHz, pulse width: 100 fs, measurement wavelength: 780 nm, average irradiation power: 50 mW) was used as a femtosecond laser 71. To adjust the output, the light was passed through an attenuator 72 composed of a ½λ plate 77 and a Glan-laser prism 73 and adjusted so as to be circular polarized light by ¼λ plate 78. The polarized light was condensed on the sample 80 by a plano-convex lens 79 having a focal distance of 100 mm. The fluorescence was collected by a coupling lens 81 having a Structural Formula (8)

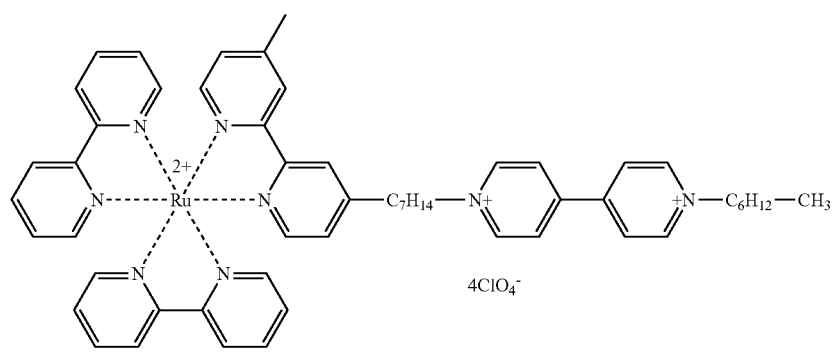

Sample Comparative Example 5 for Two-Photon (Fluorescence) Characterization

A composite material composed of fine spherical gold particles/two-photon absorption material obtained in Preparation Example 5 of Two-Photon Absorption Composite Material was dissolved in chloroform and spin-coated on a quartz base so that the film thickness becomes approximately 100 nm. Thus, a thin film sample was obtained.

focal distance of 40 mm and made to be approximately parallel light. After the excitation light was removed by a dichroic mirror 74, the remaining light was substantially condensed on a detection photodiode 83 by a plano-convex lens 82. Note that the infrared ray cut glass filter 75 was provided in front of the photodiode 83.

Fluorescence intensities of the samples in Examples and Comparative Examples were compared by an evaluation method. The results are shown in Tables 1 to 5.

The fluorescence intensities were evaluated by comparing Examples 1 to 4 with Comparative Examples 1 to 4, respectively (shown in Tables 1 to 4). Specifically, Table 1 shows a relative value of Example 1 when the fluorescence intensity of the sample of Comparative Example 1 was set to be 1. Similarly, Tables 2 to 4 show evaluation results based on relative comparisons between Examples 2 to 4 and Comparative Examples 2 to 4 (shown in Tables 2 to 4), respectively.

Table 5 shows an experiment result to confirm a difference between Comparative Example 5 (fine spherical gold particle/two-photon linking composite material, which was not resonant (absorbing) with a wavelength in a two-photon excitation wavelength region) and the photosensitized composite material (Example 1) resonant with (absorbing) a wavelength in the two-photon excitation wavelength region in the present invention.

TABLE 1

| Sample | Fluorescence Intensity (Relative Value) |
| --- | --- |
| Example 1 | 62.2 |
| Comparative Example 1 | 1 |

TABLE 2

| Sample | Fluorescence Intensity (Relative Value) |
| --- | --- |
| Example 2 | 56.5 |
| Comparative Example 2 | 1 |

TABLE 3

| Sample | Fluorescence Intensity (Relative Value) |
| --- | --- |
| Example 3 | 9.2 |
| Comparative Example 3 | 1 |

TABLE 4

| Sample | Fluorescence Intensity (Relative Value) |
| --- | --- |
| Example 4 | 8.9 |
| Comparative Example 4 | 1 |

TABLE 5

| Sample | Fluorescence Intensity (Relative Value) |
| --- | --- |
| Example 1 | 16.3 |
| Comparative Example 5 | 1 |

From the evaluation results shown in Tables 1 to 5, it was confirmed that a film composed of the photosensitized composite material of the present invention, in which the fine metal particle layer and a two-photon absorption material are linked, can enhance the two-photon fluorescence intensity, compared with a sample composed of only the two-photon absorption material. It was also confirmed that the photosensitized composite material have excellent two-photon characteristics, compared with a mixture of a gold nanorod and a two-photon absorption material. From Table 5, the composite material of the present invention resonant with (absorbing) a used light wavelength have great enhancement effects, compared with the material not resonant with (absorbing) the wavelength in Comparative Example.

The invention claimed is:

1. A photosensitized composite material, comprising:

a fine metal particle which generates an enhanced surface plasmon field in resonance with a multiphoton excitation wavelength; and a multiphoton absorption compound which has a molecular structure enabling multiphoton absorption, wherein the multiphoton absorption compound is linked to a surface of the fine metal particle, wherein the multiphoton absorption compound has the following structural forma (2):

Structural Formula (2)

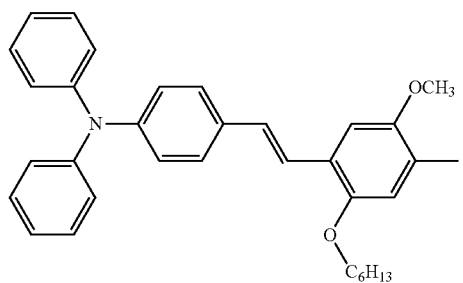

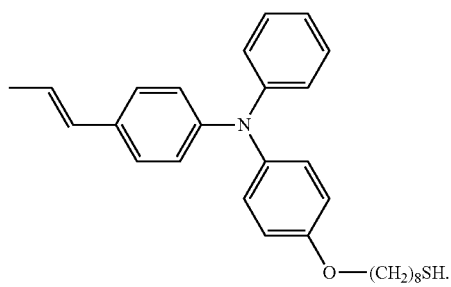

2. The photosensitized composite material according to claim 1, wherein the multiphoton excitation wavelength is a two-photon excitation wavelength, and the multiphoton absorption compound is a two-photon absorption compound.

3. The photosensitized composite material according to claim 1, wherein the fine metal particle is a gold nanorod.

4. A three-dimensional memory material, comprising:

a photosensitized composite material, wherein the three-dimensional memory material is enabled to perform recording and reproducing in a depth direction of a layer surface by light incident to the layer surface in a vertical direction, wherein the photosensitized composite material comprises a fine metal particle which generates an enhanced surface plasmon field in resonance with a multiphoton excitation wavelength, and a multiphoton absorption compound which has a molecular structure enabling multiphoton absorption, and wherein the multiphoton absorption compound is linked to a surface of the fine metal particle, wherein the multiphoton absorption compound has the following structural formula (2):

Structural Formula (2)

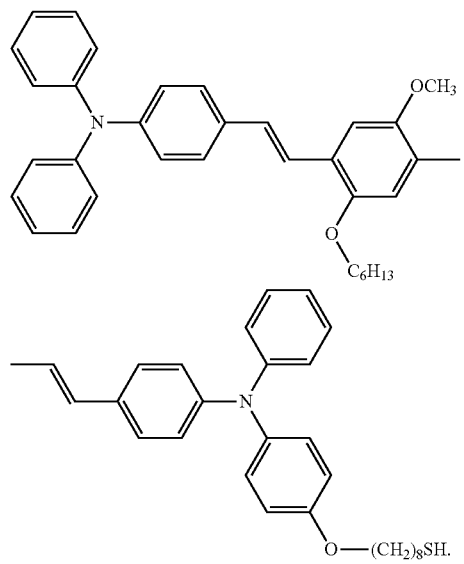

5. An optical power limiting material, comprising:
a photosensitized composite material,
wherein the photosensitized composite material comprises a fine metal particle which generates an enhanced surface plasmon field in resonance with a multiphoton excitation wavelength, and a multiphoton absorption compound which has a molecular structure enabling multiphoton absorption, and
wherein the multiphoton absorption compound is linked to a surface of the fine metal particle, wherein the multiphoton absorption compound has the following structural formula (2):

Structural Formula (2)

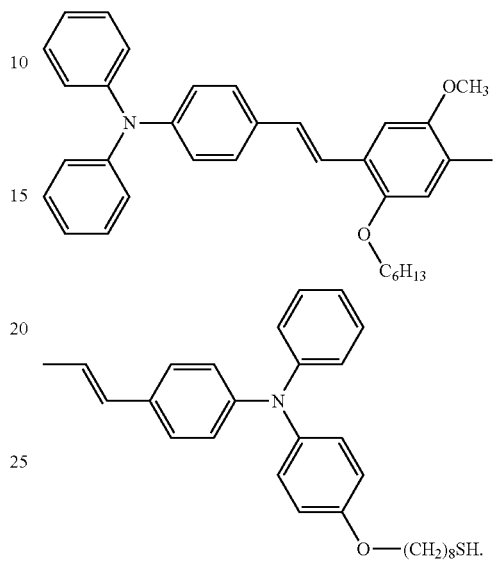

* * * * *

UNITED STATES PATENT AND TRADEMARK OFFICE
CERTIFICATE OF CORRECTION

PATENT NO. : 8,192,917 B2  Page 1 of 1
APPLICATION NO. : 12/441490
DATED : June 5, 2012
INVENTOR(S) : Tatsuya Tomura et al.

It is certified that error appears in the above-identified patent and that said Letters Patent is hereby corrected as shown below:

On the title page, Item (54), and column 1, the title is incorrect. Item (54) and column 1, should read:

-- PHOTOSENSITIZED COMPOSITE MATERIAL, THREE-DIMENSIONAL MEMORY MATERIAL AND RECORDING MEDIUM, OPTICAL POWER LIMITING MATERIAL AND ELEMENT, PHOTOCURING MATERIAL AND STEREOLITHOGRAPHY SYSTEM, AND FLUORESCENT MATERIAL FOR MULTIPHOTON FLUORESCENCE MICROSCOPE AND MULTIPHOTON FLUORESCENCE MICROSCOPE --

Signed and Sealed this
Seventh Day of August, 2012

David J. Kappos
*Director of the United States Patent and Trademark Office*